United States Patent [19]

Brunner

[11] Patent Number: 4,745,534
[45] Date of Patent: May 17, 1988

[54] MINIATURE LAMP HOLDER

[75] Inventor: Jean Brunner, La Chaux-De-Fonds, Switzerland

[73] Assignee: Universo S.A., Neuchatel, Switzerland

[21] Appl. No.: 40,340

[22] Filed: Apr. 20, 1987

[30] Foreign Application Priority Data

Apr. 24, 1986 [CH] Switzerland ............... 1.660/86-6

[51] Int. Cl.⁴ .................. F21V 19/00; F21V 21/00
[52] U.S. Cl. .................. 362/365; 362/368; 362/800
[58] Field of Search ............. 362/23, 29, 362, 365, 362/366, 800, 368, 374

[56] References Cited

U.S. PATENT DOCUMENTS

| | | | |
|---|---|---|---|
| 2,855,709 | 10/1958 | Roper | 362/29 X |
| 3,246,320 | 4/1966 | Houbolt | 362/365 X |
| 4,342,074 | 7/1982 | Bull et al. | 362/365 |
| 4,419,722 | 12/1983 | Bury | 362/800 X |
| 4,466,050 | 8/1984 | Lockard | 362/800 X |
| 4,471,414 | 9/1984 | Savage, Jr. | 362/800 X |

Primary Examiner—Tony M. Argenbright
Attorney, Agent, or Firm—Silverman, Cass, Singer & Winburn, Ltd.

[57] ABSTRACT

A miniature lamp holder comprises a first inner sleeve in which a diode lamp of parallelepiped shape is engaged, this sleeve having two small opposite faces in which are provided resilient tongues connected to the wall of the sleeve at the rear end thereof, that is to say at the end opposite to that through which the lamp engages. The thickness of the tongues increases towards their free ends. Hence, when a second outer sleeve is engaged on the first one, it acts on the tongues to press them against the lamp and thus maintain the lamp in place.

5 Claims, 2 Drawing Sheets

MINIATURE LAMP HOLDER

BACKGROUND OF THE INVENTION (a) Field of the Invention

The present invention relates to a miniature lamp holder comprising a first or inner sleeve, the cross-sectional shape of the opening of which corresponds to that of the lamp and in which the lamp is engaged, and a second or outer sleeve surrounding the first sleeve.

(b) Description of the Prior Art

Such lamp holders are known per se. They are used, most generally, with diode lamps (LED) and enable them to be fitted to panels, boards and the like.

In the known lamp holders, the inner sleeve is provided, most generally, with an annular clip gripping the lamp and which is clipped to the collar of the lamp.

However, the use of miniature lamps which are not provided with collars is increasing, and thus it becomes necessary to have lamp holders which are also satisfactory when the lateral faces of the lamps to be held are smooth.

SUMMARY OF THE INVENTION

The object of the present invention is to furnish a lamp holder which holds a miniature lamp without a collar in a reliable and satisfactory manner.

This object is achieved due to the fact that the first sleeve is provided with at least one resiliently deformable small tongue provided in its wall and connected to this wall in the neighbourhood of the end of the sleeve opposite to that end through which the lamp is engaged, the thickness of this small tongue increasing from its end connected to the said wall towards its free end, the arrangement being such that when the second sleeve is engaged on the first sleeve, it acts on the small tongue to press it against the lamp so as to maintain the lamp in place in the first sleeve.

The various features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENTS

Figure 1:
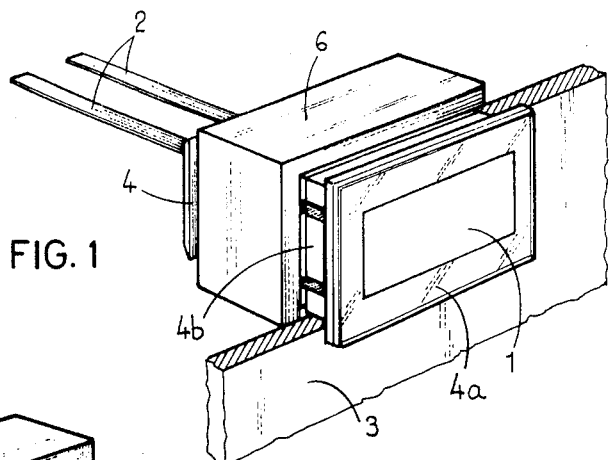
FIG. 1 is a perspective view of a miniature lamp mounted in a lamp holder constructed in accordance with the invention.
Figure 2:
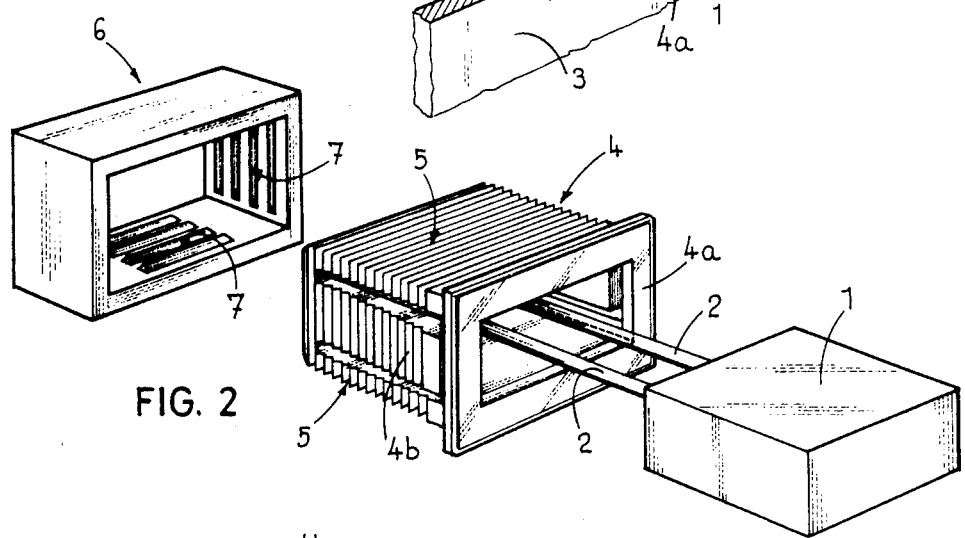
FIG. 2 is an exploded perspective view of the lamp and of the lamp holder.
Figure 3:
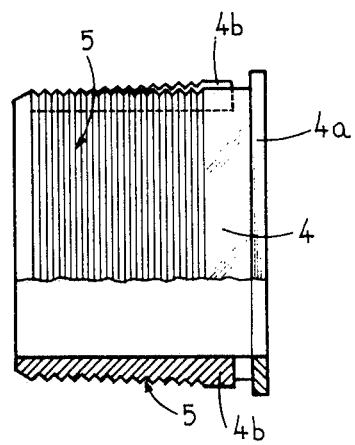
FIG. 3 is an elevational view, partially in section, of a portion of the lamp holder.
Figure 4:
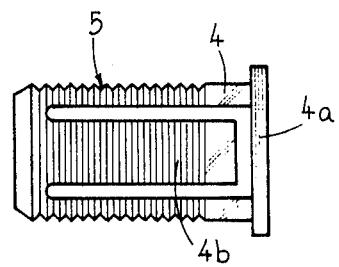
FIG. 4 is a plan view of said portion of the lamp holder.

The lamp illustrated in FIGS. 1 and 2, designated by reference 1, is a diode lamp comprising a parallelepiped shaped body, made of epoxy resin with walls which are entirely smooth and without any outer shoulder, in which body is embedded a metal filament which is not visible in the drawing, connnected to two metal connector strips 2 for making the electric connection of the lamp. The lamp is secured to a panel such as the panel 3 which has been partially shown in FIG. 1, by means of a lamp holder comprising a first or inner sleeve 4 provided, at its front end, with a flange 4a constituting a frame. The cross-section of the opening of the sleeve 4 corresponds to the section of the lamp 1 which engages with a sliding friction in this sleeve. The sleeve 4 is outwardly striated or fluted at 5, transversely with respect to its longitudinal axis. Each of the two small side faces of the sleeve 4 presents a tongue 4b, which is resiliently deformable, provided in the wall of the sleeve and connected thereto at the vicinity of the rear end of the sleeve, that is to say the opposite end to that through which the lamp 1 is engaged. The thickness of each tongue 4b increases from its end connected to the corresponding wall in the direction of its free end, as shown particularly in FIG. 3.

The lamp holder comprises moreover an outer sleeve 6 presenting transverse ridges or grooves 7 at its inside.

The outer sleeve 6 is engaged on the inner sleeve 4 when the lamp 1 is located in the inner sleeve, which results in pressing of the tongues 4b against the body of the lamp and thus ensures the maintaining in place of the lamp. The ridges or grooves 7 of the sleeve 6 engage the ridges of the sleeve 4, which ensures a firm assembly of these two elements.

Owing to the described arrangement, the lamp 1, in spite of the fact that it is not provided with an outer shoulder, can be firmly held on a panel such as the panel 3, the part 4a of the sleeve 4 constituting a frame being applied against the front face of the panel while the sleeve 6 bears on the rear face thereof.

Figure 5:
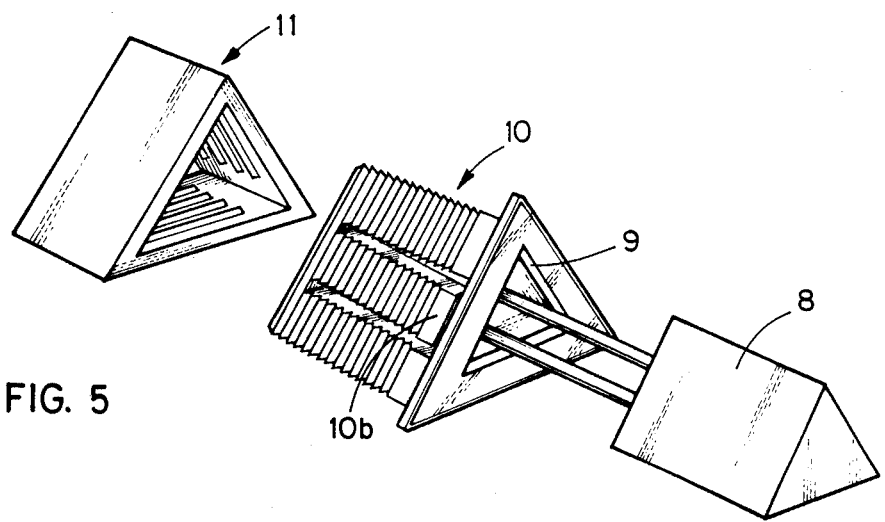
FIG. 5 is an exploded perspective view of a right prism embodiment of the lamp and lamp holder.

In the example described and illustrated in FIGS. 1-4, the lamp 1 is of parallelepiped shape. However, it could be constituted by a right prism having a triangular base such as a lamp 8, illustrated in FIG. 5. The cross-sectional shape of the opening 9 of the inner sleeve 10 of the lamp holder would then be of corresponding shape and this sleeve would present a tongue 10b of increasing thickness provided in one of its faces, on which tongue the outer sleeve 11 which would also be of triangular section would act.

Figure 6:
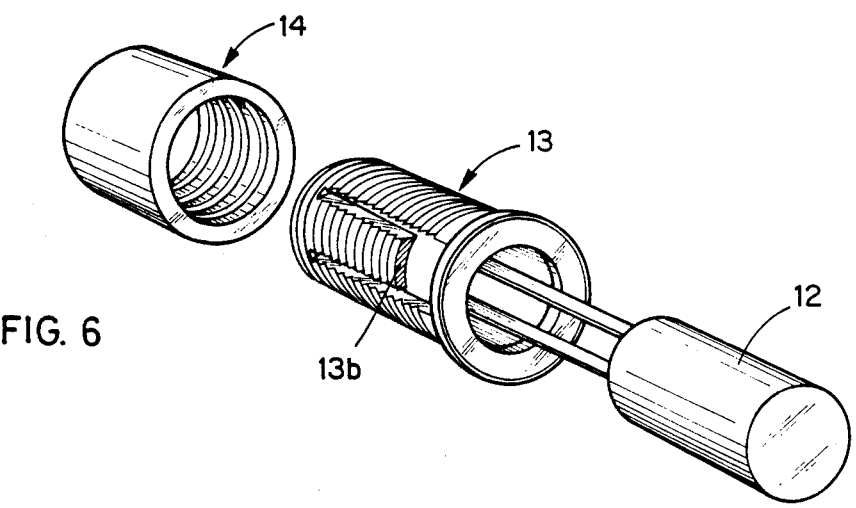
FIG. 6 is an exploded perspective view of a circular embodiment of the lamp and lamp holder.

The lamp could also be of circular section such as a lamp 12, illustrated in FIG. 6 in which case the two sleeves 13 and 14 would be correspondingly tubular 13b, the tongue or tongues of increasing thickness provided in the wall of the inner sleeve 13 being of a cross-section having the shape of arcuate segments of a circle.

I claim:

1. A miniature lamp holder comprising a first inner sleeve having an opening, the cross-sectional shape of which corresponds to that of a lamp to be held, in which sleeve the lamp is engaged, and a second outer sleeve surrounding said first sleeve, in which said first sleeve has a wall and is provided with at least one resiliently deformable small tongue provided in said wall, said tongue being connected to said wall in the neighbourhood of an end of said first sleeve opposite to that end through which the lamp is engaged, the thickness of said tongue increasing from an end thereof connected to said wall towards a free end of the tongue, the arrangement being such that, when said second sleeve is engaged on said first sleeve, it acts on said tongue to press it inwardly against the lamp so as to maintain the lamp in place in the first sleeve.

2. A lamp holder as claimed in claim 1, in which both said sleeves are striated transversely with respect to a longitudinal sleeve axis, the first sleeve being striated outwardly and the second sleeve being striated inwardly, so that the striation grooves of one of said sleeves engage the striation grooves of the other one of said sleeves whereby to maintain the assembled condition of said two sleeves.

3. A lamp holder as claimed in claim 1, for use with a lamp of parallelepiped shape, in which said opening of the first sleeve is of rectangular cross-sectional shape and said first sleeve has two opposed faces, and said resiliently deformable small tongue is one of two such tongues respectively provided in said opposed faces of said first sleeve.

4. A lamp holder as claimed in claim 1, for a lamp having the shape of a right prism with a triangular base, in which the first sleeve, of corresponding sectional shape, has said small tongue provided in one of its three faces.

5. A lamp holder as claimed in claim 1, for use with a lamp of circular section, in which the small tongue provided in the wall of the first sleeve, which is cylindrical, is of a section having the shape of a segment of circle.

* * * * *